(12) United States Patent
Krasnostavsky et al.

(10) Patent No.: US 11,216,763 B1
(45) Date of Patent: Jan. 4, 2022

(54) SYSTEM, METHOD, AND COMPUTER PROGRAM FOR AUTOMATICALLY TRANSLATING BUSINESS MODELS TO TECHNICAL MODELS

(71) Applicant: Amdocs Development Limited, Limassol (CY)

(72) Inventors: Alexander Krasnostavsky, Kfar-Saba (IL); Nareeman Khayat, Akko Old (IL); Sivan Shahak, Rishon Lezion (IL); Meital Levy, Rishon Lezion (IL); Ilan Benjamin Granet, Ashdod (IL); Yogev Magal, Rehovot (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 1143 days.

(21) Appl. No.: 15/136,839

(22) Filed: Apr. 22, 2016

Related U.S. Application Data

(60) Provisional application No. 62/155,418, filed on Apr. 30, 2015.

(51) Int. Cl.
  *G06Q 10/06* (2012.01)
  *G06Q 10/00* (2012.01)

(52) U.S. Cl.
  CPC ....... *G06Q 10/0637* (2013.01); *G06Q 10/067* (2013.01)

(58) Field of Classification Search
  USPC ..................................................... 705/7.36
  See application file for complete search history.

(56) References Cited

U.S. PATENT DOCUMENTS

| | | | | |
|---|---|---|---|---|
| 7,747,648 B1* | 6/2010 | Kraft | ..................... | G06F 16/288 |
| | | | | 707/790 |
| 8,635,113 B2* | 1/2014 | Borders | ............. | G06Q 30/0635 |
| | | | | 705/27.1 |
| 2005/0021541 A1* | 1/2005 | Rangadass | ............. | G06Q 10/06 |
| 2007/0179821 A1* | 8/2007 | Poetsch | ..................... | G06F 8/10 |
| | | | | 705/7.27 |
| 2009/0094112 A1* | 4/2009 | Cesarini | .............. | H04L 12/1457 |
| | | | | 705/14.36 |

(Continued)

OTHER PUBLICATIONS

L.O. Meertens et al., Mapping the Business Model Canvas to ArchiMate, Mar. 2012, Association for Computing Machinery, pp. 1694-1701 (Year: 2012).*

*Primary Examiner* — Timothy Padot
*Assistant Examiner* — Allison M Neal
(74) *Attorney, Agent, or Firm* — Zilka-Kotab, P.C.

(57) ABSTRACT

A system, method, and computer program product are provided for automatically mapping business models to technical models. In use, business entity information and corresponding business entity fields are received for defining a business model. The business entity information is associated with one or more business entities selected by a user in accordance with a business request. Additionally, each business entity of the one or more business entities and the corresponding business entity fields are mapped to one or more technical entities and corresponding technical entity fields of a technical model. Further, an online translation of the business model to the technical model is performed such that changes or updates to the business model will cause changes or updates to the technical model, based on the mapping.

10 Claims, 16 Drawing Sheets

(56) References Cited

U.S. PATENT DOCUMENTS

| | | | | |
|---|---|---|---|---|
| 2014/0196001 A1* | 7/2014 | Ioannou | ................... | G06F 8/35 |
| | | | | 717/104 |
| 2015/0370897 A1* | 12/2015 | Liu | ..................... | G06Q 10/067 |
| | | | | 707/770 |
| 2015/0371159 A1* | 12/2015 | Bai | ................. | G06Q 10/06316 |
| | | | | 705/7.26 |
| 2016/0162561 A1* | 6/2016 | Hazlewood | ......... | G06F 11/1451 |
| | | | | 707/624 |

* cited by examiner

FIGURE 4

Master Enterprise Catalog

[Designer]

Promotion

- Business Activity Type
- Business Entity

Details
Name: Promotion
Display Name: Promotion
Description:

Status: [Draft]

Target Templates

Structure

| Name | Type | Subtype |
|------|------|---------|
|      |      |         |
|      |      |         |

[Add]
[Remove]

400

Change Rate

General details

[General form]
[Text input field] Name
[Date input field]

▼ Effective From
   Change Rate
   [W] Date input field
       Effective From

Add On Widgets

▼ Name
   Change Rate
   [W] Text input field
       Name
   [W] Text area input field
       Name Cancel   Save & Close   Continue

| Available fields | Properties |
| --- | --- |
| | Filter |

Showing 9 fields

+ [w] Page content
+ [w] Page content
       Specific Content 1
+ [w] Page content
       Specific Content 2
+ [w] Page content
       Specific Content 3
+ [w] Page content
       Specific Content 4
+ [w] Page content
       Specific Content 5
+ [w] Page content
       Specific Content 6
...

FIGURE 13

SYSTEM, METHOD, AND COMPUTER PROGRAM FOR AUTOMATICALLY TRANSLATING BUSINESS MODELS TO TECHNICAL MODELS

CLAIM OF PRIORITY

This application claims the benefit of U.S. Provisional Application No. 62/155,418, filed Apr. 30, 2015, the entire contents of which are incorporated herein by reference.

FIELD OF THE INVENTION

The present invention relates to generating business models associated with enterprise catalogs, and more particularly to efficiently translating business model changes and updates to a corresponding technical model.

BACKGROUND

During design of new business requests, the translation of business requests to a catalog model may lead to back and forth between business and information technology (IT) units. This is because of different terminology between the units and the use of different models.

When the business request is cleared, an IT user (implementer) will be using the information gathered from the business team to 'translate' the needed changes to the technical model. Current master enterprise catalogs (MECs) are technically structured and require technical expertise and targeted training for the data model and tool.

There is thus a need for addressing these and/or other issues associated with the prior art.

SUMMARY

A system, method, and computer program product are provided for automatically translating business models to technical models. In use, business entity information and corresponding business entity fields are received for defining a business model. The business entity information is associated with one or more business entities selected by a user in accordance with a business request. Additionally, each business entity of the one or more business entities and the corresponding business entity fields are mapped to one or more technical entities and corresponding technical entity fields of a technical model. Further, an online translation of the business model to the technical model is performed such that changes or updates to the business model will cause changes or updates to the technical model, based on the mapping.

BRIEF DESCRIPTION OF THE DRAWINGS

FIG. 4 illustrates a user interface of the business implementation studio for defining a business model, in accordance with one embodiment.

FIG. 10 illustrates a user interface for flow design, including a context sensitive widget palette, in accordance with one embodiment.

FIG. 13 illustrates a widget pallet user interface, in accordance with one embodiment.

DETAILED DESCRIPTION

Figure 1:
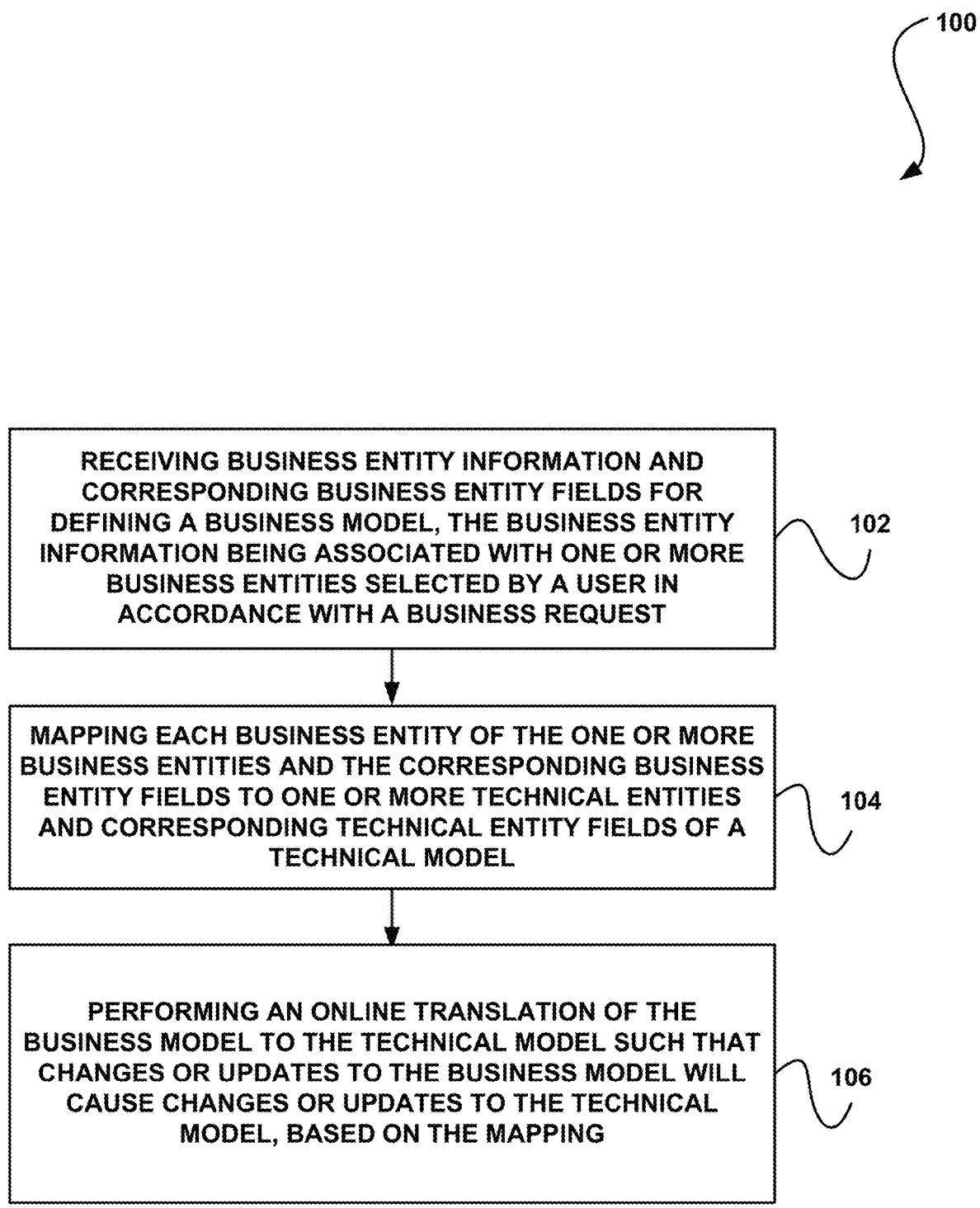
FIG. 1 illustrates a method for automatically translating business models to technical models, in accordance with one embodiment.

FIG. 1 illustrates a method 100 for automatically translating business models to technical models, in accordance with one embodiment.

As shown, business entity information and corresponding business entity fields are received for defining a business model. See operation 102. The business entity information is associated with one or more business entities selected by a user in accordance with a business request.

The business entity information and the corresponding business entity fields are received by a user interface selection. For example, the user interface may present a plurality of business entities, and associated fields, that are stored in a master enterprise catalog.

The business entity information may include any information associated with products, services, and/or any other entity associated with a master enterprise catalog. For example, the user may use the interface to define a business model by creating business entities, relations, and fields. The master enterprise catalog may be associated with any entity or industry, such as a communication service provider, etc.

As shown further in FIG. 1, each business entity of the one or more business entities and the corresponding business entity fields are mapped to one or more technical entities and corresponding technical entity fields of a technical model. See operation 104.

In one embodiment, the mapping may be performed automatically based on a user selection of the business entities and the business entity fields utilizing a user interface. For example, the user interface may be utilized by a user to map each field of a business entity to the technical model field. Field mapping may be done using auto simple mapping by selecting the technical field. For example, a promotion name field may be mapped to a billing offer name, etc.

In another embodiment, the mapping may be performed by writing mapping logic utilizing a user interface. For example, the user interface may allow for complex mapping by writing the mapping logic in groovy script. For example, the user may define a promotion category value that should be stored according to business logic.

Further, an online translation of the business model to the technical model is performed such that changes or updates to the business model will cause changes or updates to the technical model, based on the mapping. See operation 106.

The online translation refers to a real time or near real time translation between the models, without the need to synchronize various databases. Thus, changes or updates to the technical model will cause changes or updates to the business model and vice versa. In various embodiments, the online translation may be performed during a load of an existing technical element or when submitting a business entity utilizing a user interface.

This may be accomplished by the business model and the technical model both utilizing a common persistent layer. The common persistent layer may be stored in a common database (or common group of databases, etc.). In this case, the business model and the technical model may use different presentation layers.

The method 100 may be implemented to reduce manual activities for common post production changes, for automation of the flow, and data propagation to the catalog. In addition, the method 100 may be implemented to allow the business user to actually drive the changes to the catalog and to provide robust ('behind the scenes') translation capabilities to the master enterprise catalog data model. The method 100 may also be utilized to facilitate configuration actions and drastically improve marketing analysts' productivity (reducing both operational costs and TTM).

Further, in one embodiment, a system may implement the method 100 to employ a Business Implementation Studio that allows the defining of a business model that can be mapped to the catalog data (i.e. technical model) via a configuration tool (i.e. a designer) and provide online two-direction translation between the business layer and the technical layer. A system may implementing the method 100 may also be utilized for modeling the marketing customization interfaces by WYSIWYG interface concepts, where services and activities may be modeled in forms and configuration points as widgets.

Each one of the models may have its own presentation layer while both using the same persistent layer (e.g. one database). All of this increases the time to market. Defining a business model will simplify the on-going business request of the customer.

It should also be noted that the method 100 may be implemented utilizing various systems, hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
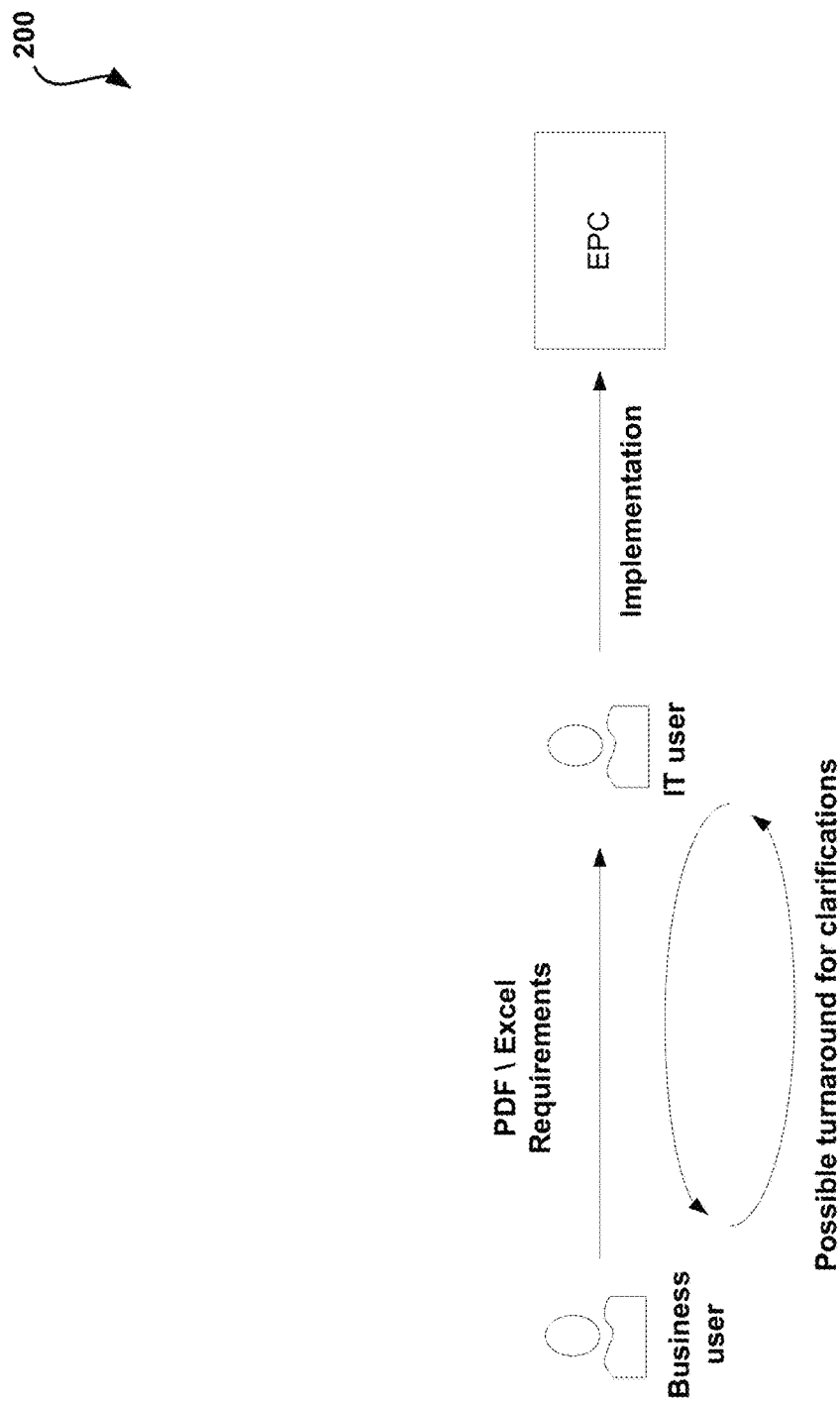
FIG. 2 shows back-and-forth communication between a business user and an IT user, in accordance with one example.

Utilizing current systems, when a change request provided by a business unit is communicated to an IT unit for implementation, users will need to detail down the required changes. This may follow with a back-and-forth communication channel to ensure correct understanding of the requirements prior implementation in a master enterprise catalog. Finally the IT user translates the needed changes and implements the request using the master enterprise catalog tool. FIG. 2 shows back-and-forth communication 200 between a business user and an IT user, in accordance with one example.

Figure 3:
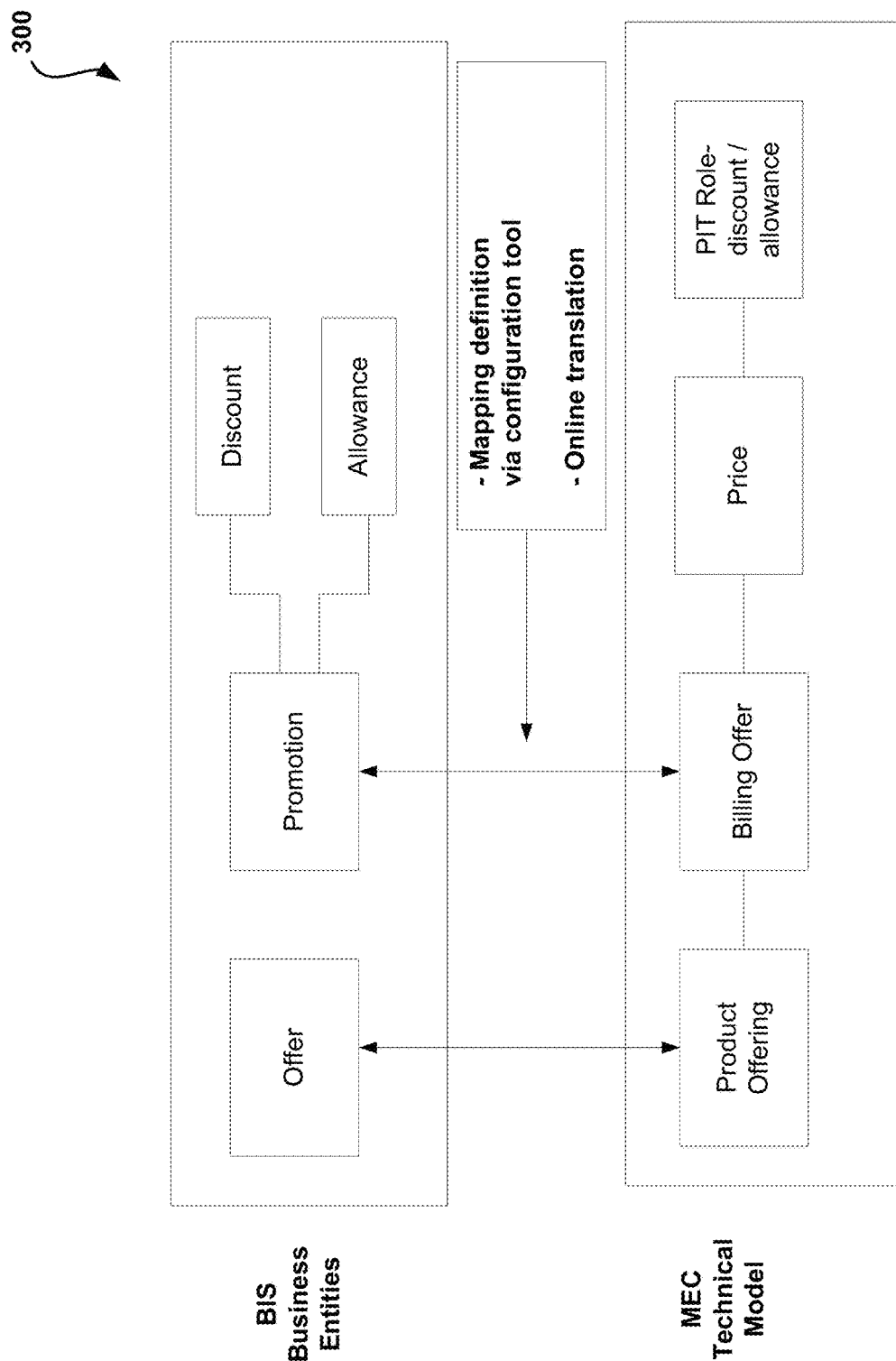
FIG. 3 illustrates a system flow diagram of a business model mapped to a technical model, in accordance with one embodiment.

FIG. 3 illustrates a system flow diagram 300 of a business model mapped to a technical model, in accordance with one embodiment. As an option, the diagram 300 may be implemented in the context of the details of the previous Figures. Of course, however, the diagram 300 may be implemented in the context of any desired environment. Further, the aforementioned definitions may equally apply to the description below.

Using the new business implementation studio, each customer will have a business model that is mapped to a technical model. This abstraction layer of the model simplifies the technical and detailed model.

Additionally, using the business implementation studio, the business user can browse the catalog data and gather all the needed information in order to define a business request. The business user can also perform the change that will actually drive the changes to the master enterprise catalog.

The business implementation studio converts the technical model to the business model and vice versa. This is done using online translation between the models. One online translation advantage is that instead of keeping two persistent databases for each presentation layer and synchronizing between these databases, the translation may be performed online.

FIG. 4 illustrates a user interface 400 of the business implementation studio for defining a business model, in accordance with one embodiment. As an option, the user interface 400 may be implemented in the context of the details of the previous Figures. Of course, however, the user interface 400 may be implemented in the context of any desired environment. Further, the aforementioned definitions may equally apply to the description below.

The user interface 400 represents a master enterprise catalog designer that is capable of defining a business model, including the creation of new business entities by the master enterprise catalog designer. The entities may include, for example, promotion, discount, allowance, and product offer, etc. The user interface 400 gives the user the ability to define a business model by creating business entities, relations and fields.

Figure 5:
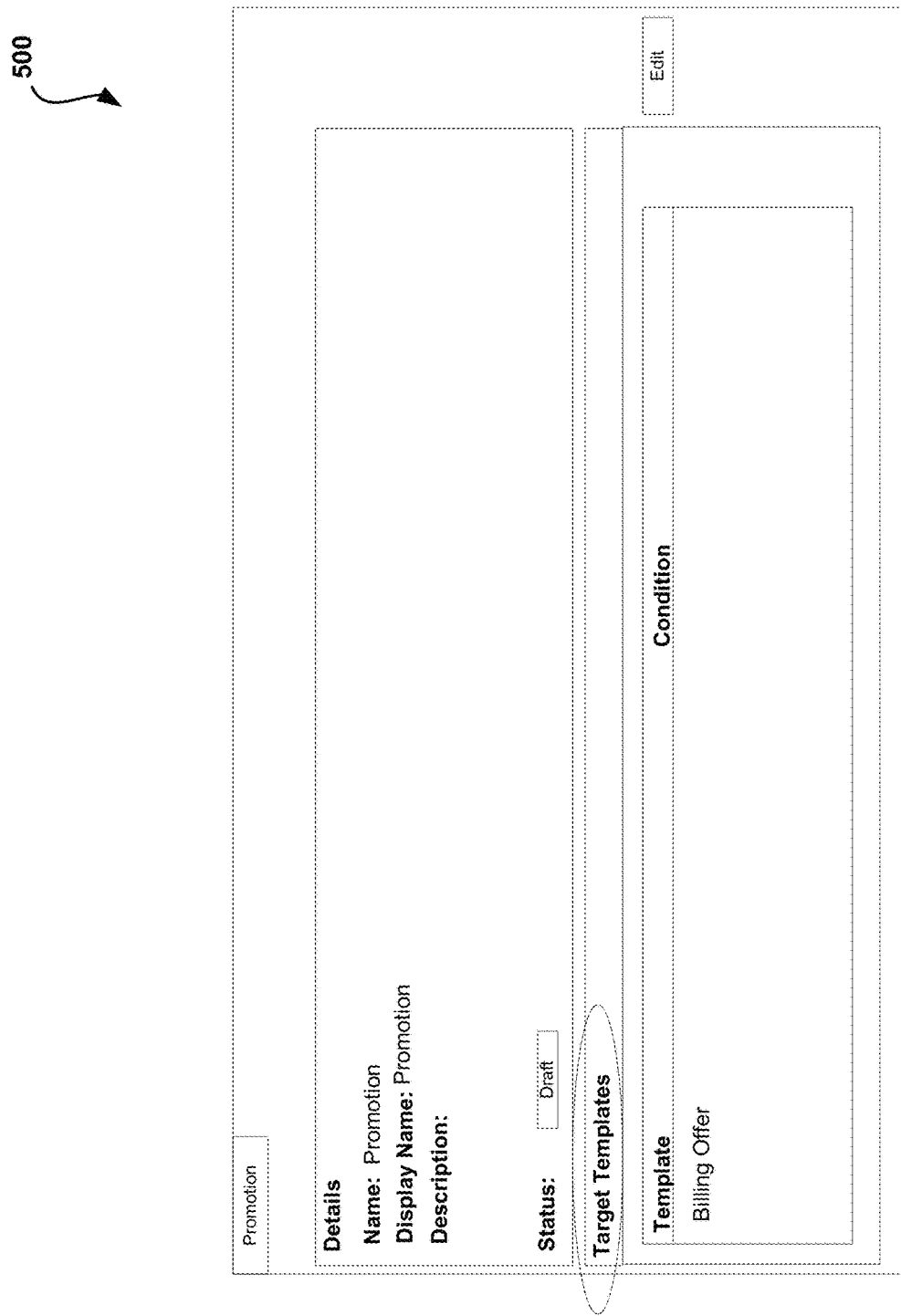
FIG. 5 illustrates a user interface of the business implementation studio for mapping between business entities and a technical model, in accordance with one embodiment.

FIG. 5 illustrates a user interface 500 of the business implementation studio for mapping between business entities and a technical model, in accordance with one embodiment. As an option, the user interface 500 may be implemented in the context of the details of the previous Figures. Of course, however, the user interface 500 may be implemented in the context of any desired environment. Further, the aforementioned definitions may equally apply to the description below.

The user interface 500 may be utilized to map each business entity to one or more technical entities (e.g. utilizing an ASPIM template, etc.), and if it is more than a technical entity, define a condition. For example, a Promotion business entity may be mapped to a Billing Offer technical entity.

Figure 6:
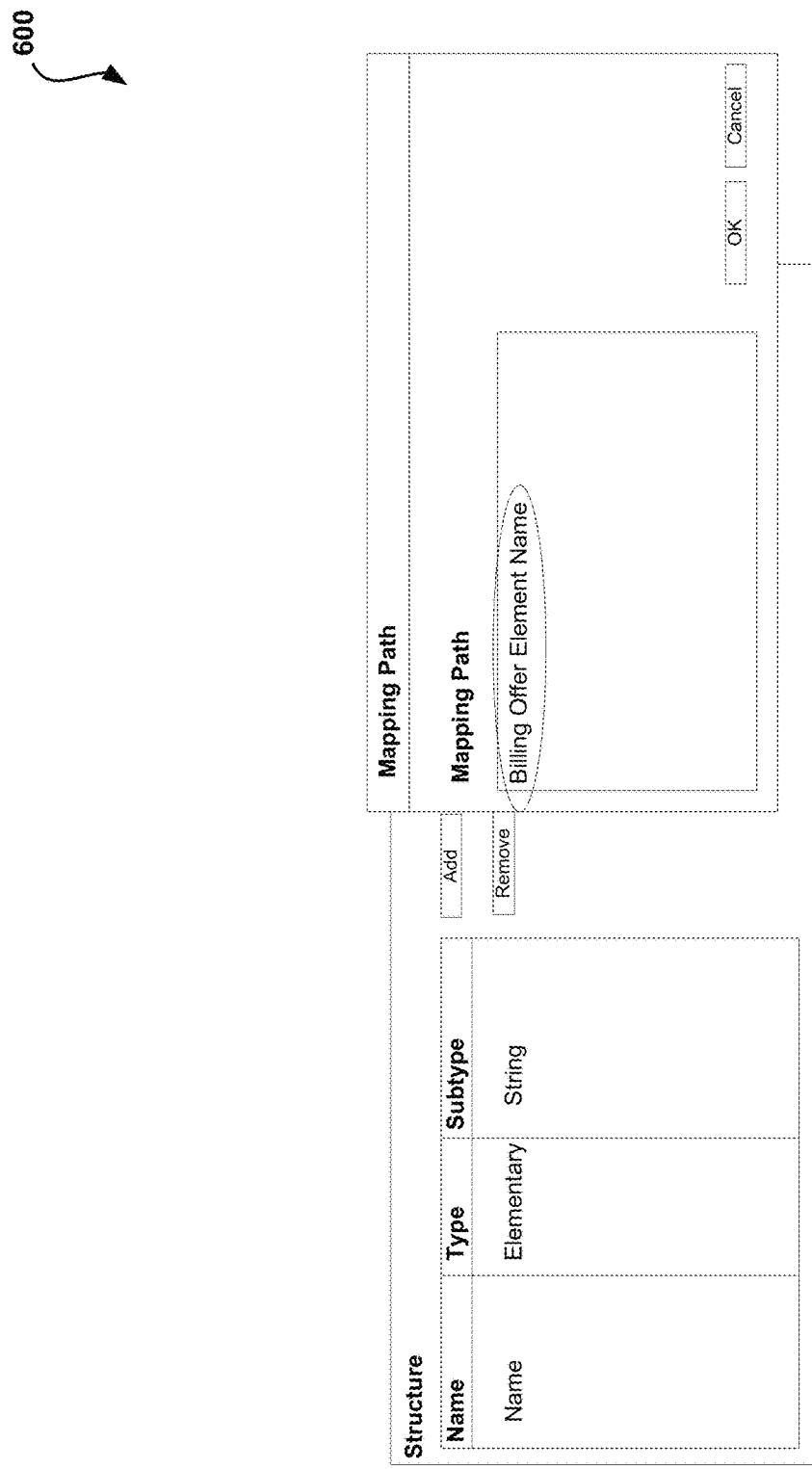
FIG. 6 illustrates a user interface of the business implementation studio for mapping each field of the business entity to the technical model field, in accordance with one embodiment.

FIG. 6 illustrates a user interface 600 of the business implementation studio for mapping each field of the business entity to the technical model field, in accordance with one embodiment. As an option, the user interface 600 may be implemented in the context of the details of the previous Figures. Of course, however, the user interface 600 may be implemented in the context of any desired environment. Further, the aforementioned definitions may equally apply to the description below.

The user interface 600 may be utilized by a user to map each field of a business entity to the technical model field. Field mapping may be done using auto simple mapping by selecting the technical field. For example, the Promotion name field may be mapped to the Billing Offer name.

Figure 7:
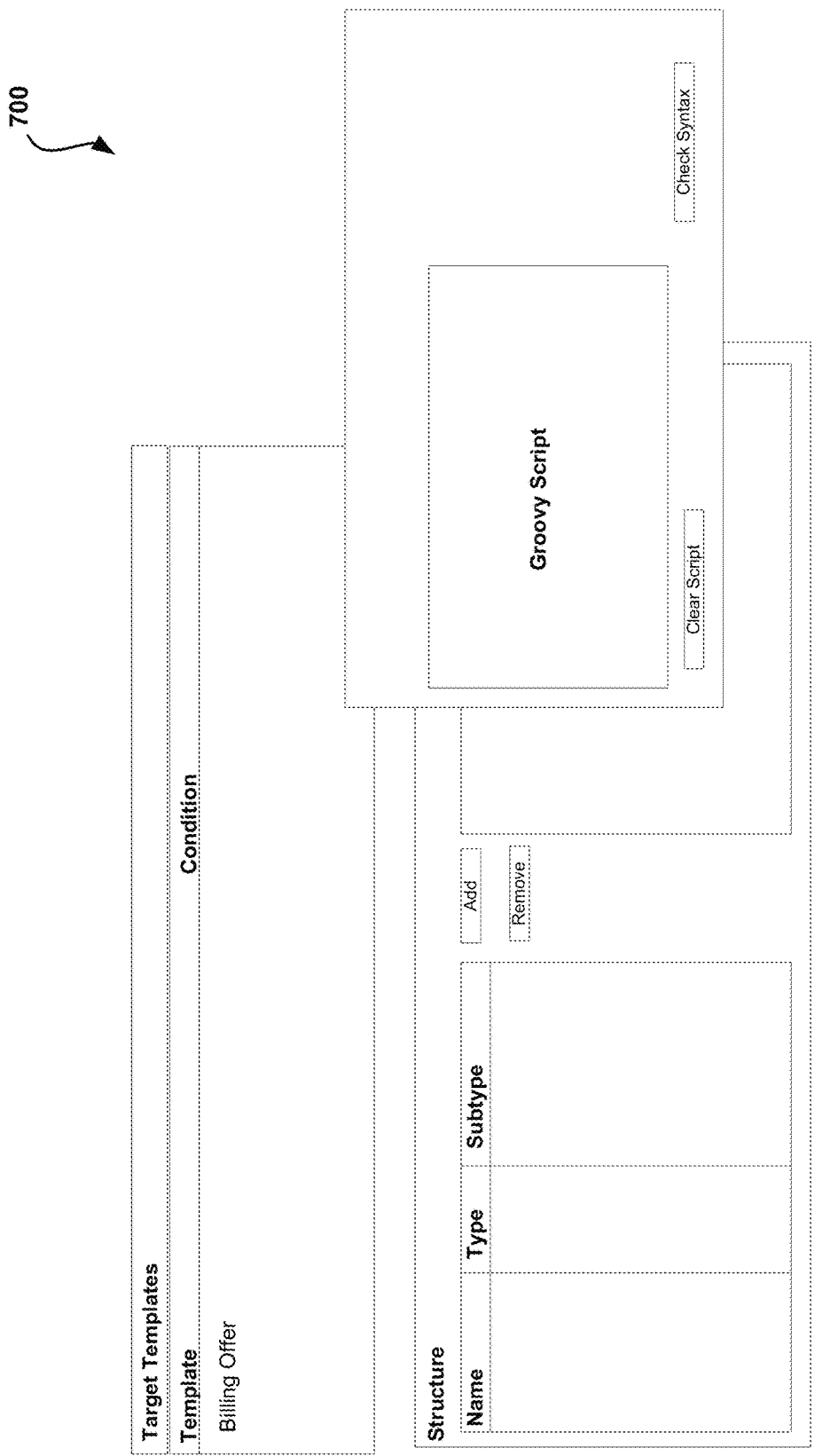
FIG. 7 illustrates a user interface of the business implementation studio for complex mapping, in accordance with one embodiment.

FIG. 7 illustrates a user interface 700 of the business implementation studio for complex mapping, in accordance with one embodiment. As an option, the user interface 700 may be implemented in the context of the details of the previous Figures. Of course, however, the user interface 700 may be implemented in the context of any desired environment. Further, the aforementioned definitions may equally apply to the description below.

The user interface 700 allows for complex mapping by writing the mapping logic in groovy script, for example. When the mapping logic is more complex, the implementer can define it using the script. For example, the user may define the Promotion Category value that should be stored according to business logic.

The business implementation studio may include a variety of computer code implemented by one or more systems. Such systems, in operation, allow for online translation between business entities and a technical model.

For example, during the load of an existing technical element or when submitting a business entity there may be an online translation between the business model and technical model. Also, upon a submit operation, an in memory operation which maps the business entity to technical entity, it may create/update/delete technical entities. Upon a load operation, which is an in memory operation that maps the technical entity to a business entity, it creates needed business entities.

To date there is no mapping tool that maps between a business model and a technical model. Usually translation between models is done using a distribution process, which saves the data to the database. The business implementation studio gives the user an ability to define an abstraction layer which simplifies the business user's day to day job. The business user can perform activities without understanding the model entities, the relations, and all the technical information behind them.

The business implementation studio designer system/tool enables customizing business activities, as well as the capability to define new activities to be used by marketing staff. The designer systems/tools allow the user to design business activities, comprised of a set of forms, where each form supports a different step in the activity. The designer system/tool is very intuitive and built with a simple drag and drop mechanism, while every action will be reflected immediately on the flow execution. The tool designer allows the business user to configure services for complex systems. Designed services may be saved and may later be reused in any other step of the flow, or in any other flow that involves similar data.

To edit each step, the business implementation studio designer tool offers a list of graphical widgets organized in a palette. Each step may be designed as a page that includes a set of graphical widgets that will later (at activity runtime) be used to capture the data that is necessary for the specific activity.

In one embodiment, the widget palette may include a pre-bound widgets palette. In this case, whenever the user drags any of these widgets, the widget is already bound to a corresponding business field and the user does not have to bind it manually.

The widget repository includes a definition for each widget, indicating which types of data it can support. When building the widget palette, the widget building algorithm binds the widgets to the fields according to their type and puts the pre-bound widgets in the palette.

Figure 8:
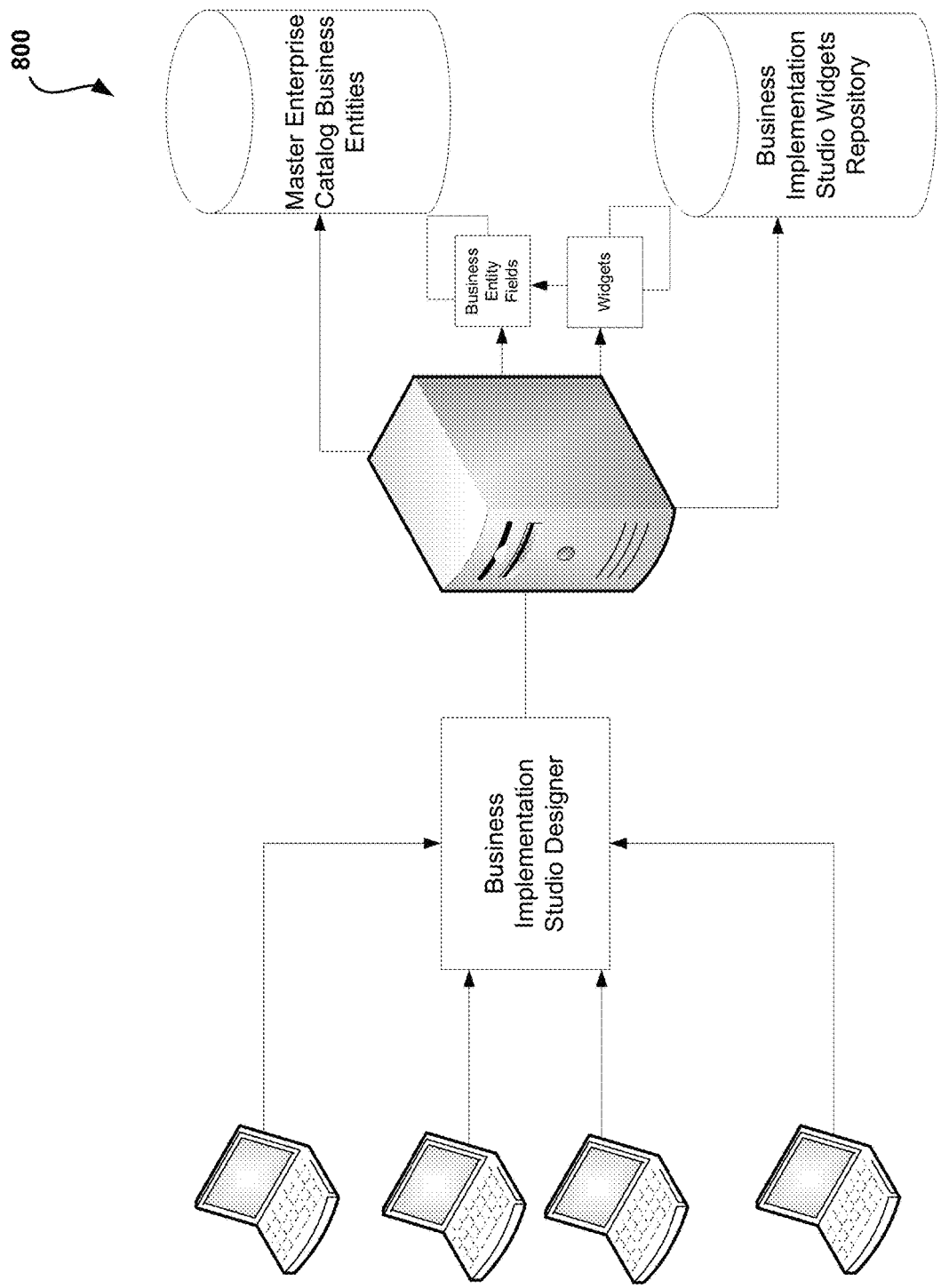
FIG. 8 illustrates a system for implementing the business implementation studio for complex mapping, in accordance with one embodiment.

FIG. 8 illustrates a system 800 for implementing the business implementation studio for complex mapping, in accordance with one embodiment. As an option, the system 800 may be implemented in the context of the details of the previous Figures. Of course, however, the system 800 may be implemented in the context of any desired environment. Further, the aforementioned definitions may equally apply to the description below.

The system 800 represents an architecture that supports the pre-bounded widget algorithm, in accordance with one embodiment. The left of the diagram represents all users that are running the business implementation studio system and that are defining or executing flows. The right side of the diagram shows the collaboration between a master enterprise catalog (MEC), which defines the business model, and the repository that holds all the widgets types.

Figure 9:
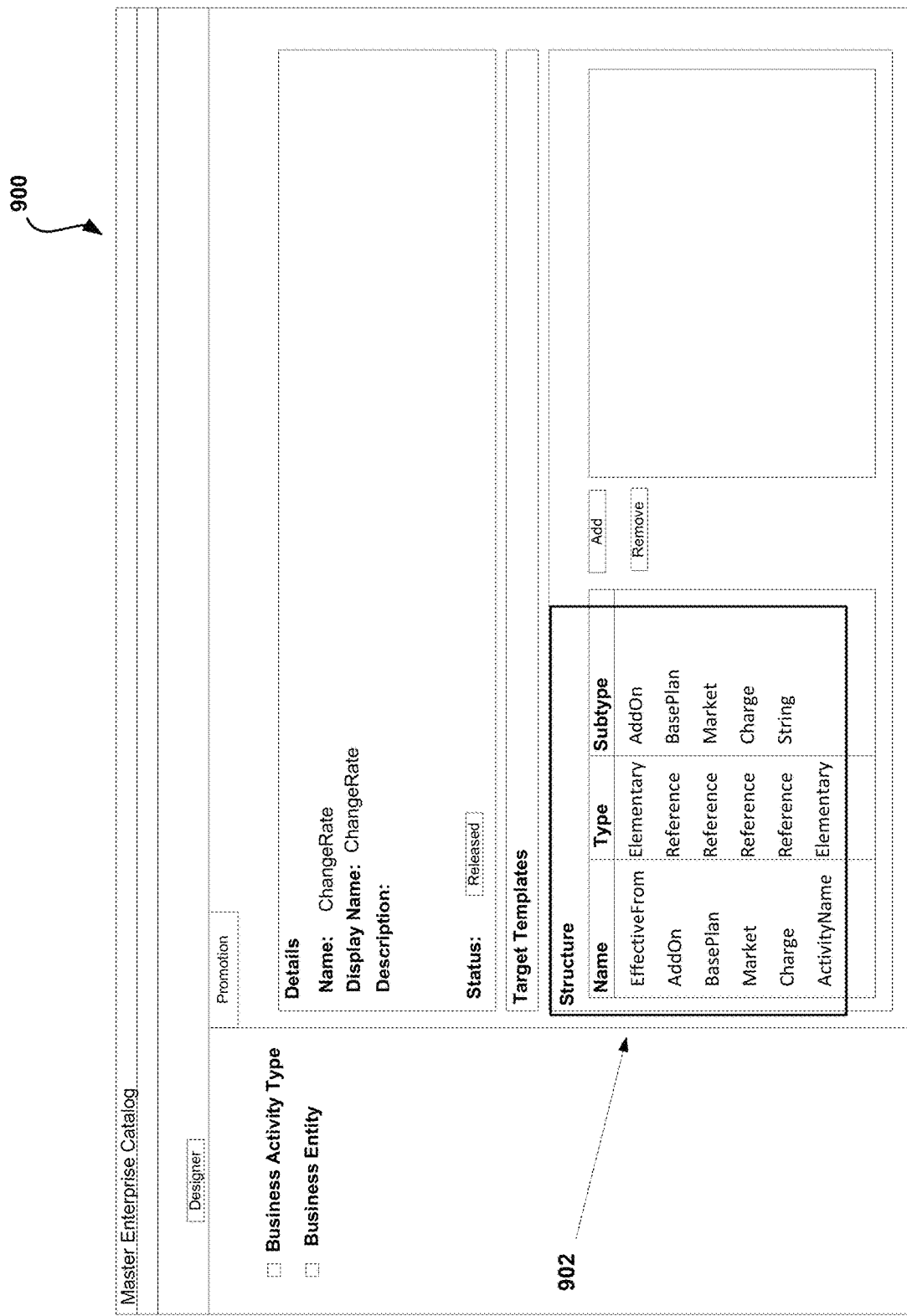
FIG. 9 illustrates a user interface for creating a new activity flow, in accordance with one embodiment.

FIG. 9 illustrates a user interface 900 for creating a new activity flow, in accordance with one embodiment. As an option, the user interface 900 may be implemented in the context of the details of the previous Figures. Of course, however, the user interface 900 may be implemented in the context of any desired environment. Further, the aforementioned definitions may equally apply to the description below.

The user interface 900 shows an example of generation of a new activity flow that is defined in the master enterprise calendar, with all the relevant fields 902 for making the flow executable (EffectiveFrom, name, etc.).

The business implementation studio designer system allows viewing of available fields, with the related widgets for each one (e.g. in this example, the "EffectiveFrom" field will have only Date related widgets, and "Name" field will have only String related widgets, etc., as shown in FIG. 10).

FIG. 10 illustrates a user interface 1000 for flow design, including a context sensitive widget palette, in accordance with one embodiment. As an option, the user interface 1000 may be implemented in the context of the details of the previous Figures. Of course, however, the user interface 1000 may be implemented in the context of any desired environment. Further, the aforementioned definitions may equally apply to the description below.

The business implementation studio designer system includes a context sensitive widget palette. The flow designer includes many types of graphical widgets. Some of the graphical widgets are graphical controls that may be used for alignment and usability purposes and some graphical widgets are bound-able to data and should be used to capture the step-related data. Each bound-able widget supports a specific data type. For example, the "Text Input" or "Text Area" widgets support binding to data of type String, while the widget named "Date Input" can be used to bind data of type Date. The widget palette offers a variety of widgets, not only according to the field data type, but some special widgets are available to the user according to business type.

When the user designs a page, instead of having to select the suitable widgets out of an overloaded widgets palette, where most of them are not necessary for the specific context, the user gets only the set of widgets that the user may need to use according to the data that the user has in the context of his business activity.

Figure 11:
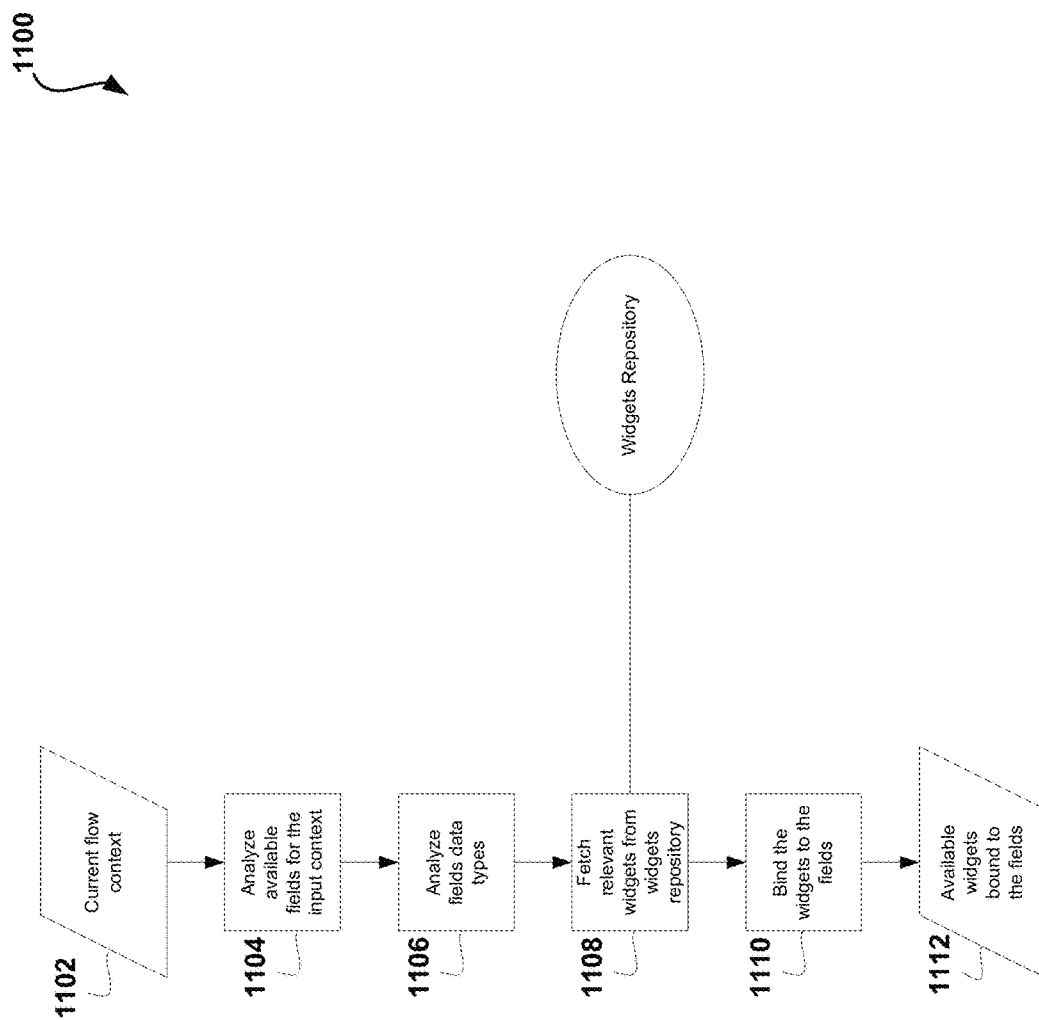
FIG. 11 illustrates a flow diagram for a context sensitive widget palette algorithm, in accordance with one embodiment.

FIG. 11 illustrates a flow diagram 1100 for a context sensitive widget palette algorithm, in accordance with one embodiment. As an option, the flow diagram 1100 may be implemented in the context of the details of the previous Figures. Of course, however, the flow diagram 1100 may be implemented in the context of any desired environment. Further, the aforementioned definitions may equally apply to the description below.

For the context sensitive widget palette algorithm operation, each activity type has a defined set of data fields. When starting to design the activity flow, the context of the design is the activity itself. The algorithm scans the widgets repository for widgets that are applicable for any of activity fields according to their type.

When the user wants to drag additional widgets below an existing widget, the user gets only widgets that can be bound to fields that are accessible according to the context of the parent widget. In addition to the context of the widget that is in focus, special widgets are available based on a specific entities only. This makes it easier for the user to design the page, having a palette that is filtered according to the business context and avoids mistakes and runtime errors that can occur if the user would have tried to bind data that is not be available in that context.

In operation, a current flow context is determined (see step 1102); available field for the input context are analyzed (see step 1104); field data types are analyzed (see step 1106); relevant widgets are fetched from the widgets repository (see step 1108); and the widgets are bound to the fields (see steps 1110 and 1112). This flow is carried out by the business implementation studio designer system.

When working with the business implementation studio designer system, the user (e.g. part of the marketing staff) may design the flow services by composing configuration steps of the system (modeled by widgets). The widget approach may be used to make the software component ecosystem reusable.

When saving a flow service, the flow service is automatically assigned to a context for which it is suitable. The context is computed according to the content of the flow service, while saving it. Therefore, because all components that composed the flow service are data bounded, the flow service itself becomes data bounded.

Figure 12:
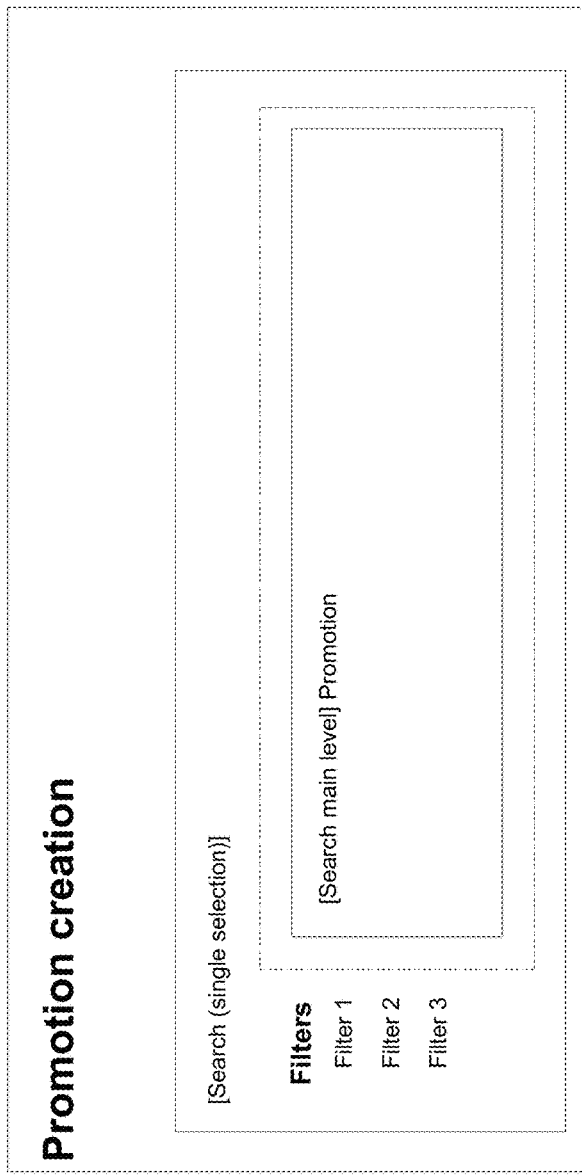
FIG. 12 illustrates a user interface for flow design, in accordance with one embodiment.

FIG. 12 illustrates a user interface 1200 for flow design, in accordance with one embodiment. As an option, the user interface 1200 may be implemented in the context of the details of the previous Figures. Of course, however, the user interface 1200 may be implemented in the context of any desired environment. Further, the aforementioned definitions may equally apply to the description below.

As an example, as shown in FIG. 12, this flow service is only composed of a pre-bounded search widget, in which the context is "Promotion". When the save action is performed, an algorithm will compute the context of the flow service by searching the common context for all components of which it is composed. In this example, the context of the flow service will be Promotion.

Later, if the user is getting to the same context, either in another step of the same flow or in any other flow, the flow service that had been designed before is available for selection in the widget palette as any other widget.

FIG. 13 illustrates a widget pallet user interface 1300, in accordance with one embodiment. As an option, the user interface 1300 may be implemented in the context of the details of the previous Figures. Of course, however, the user interface 1300 may be implemented in the context of any desired environment. Further, the aforementioned definitions may equally apply to the description below.

The widget palette allows the user to reuse the same flow service in any other step. The user is also given the option to decide if the user wants to use the same instance as the pre-designed service, in which case any changes the user makes will reflect all the other occurrences of that service. The user may also duplicate a service, in which case this will become a separate independent service and will not affect other occurrences.

The reuse is on a sub-flow level rather than a full saved design. Moreover, the reuse is on any sub-level in the design. Although the flow is comprised by several pages, the tool designer allows a user to take and reuse a specific sub-flow from another flow, and not the whole flow.

The reuse is seamless. The user does not need to consider whether this flow service may become handy in the future. When the user is designing a flow service (e.g. Flow 1), the user is just working commonly on this specific flow, and the user does not have to determine which sub-flows should be saved for later. Later, the user may design another flow service, and the user can get all the sub-flows that suit the user's needs from the previous designed flow (Flow 1), although the user did not deliberately save the flow for reuse in the past. The reusable sub-flow is kept with its contextual data binding, so when it is reused, there will be no extra effort in re-binding.

Figure 14:
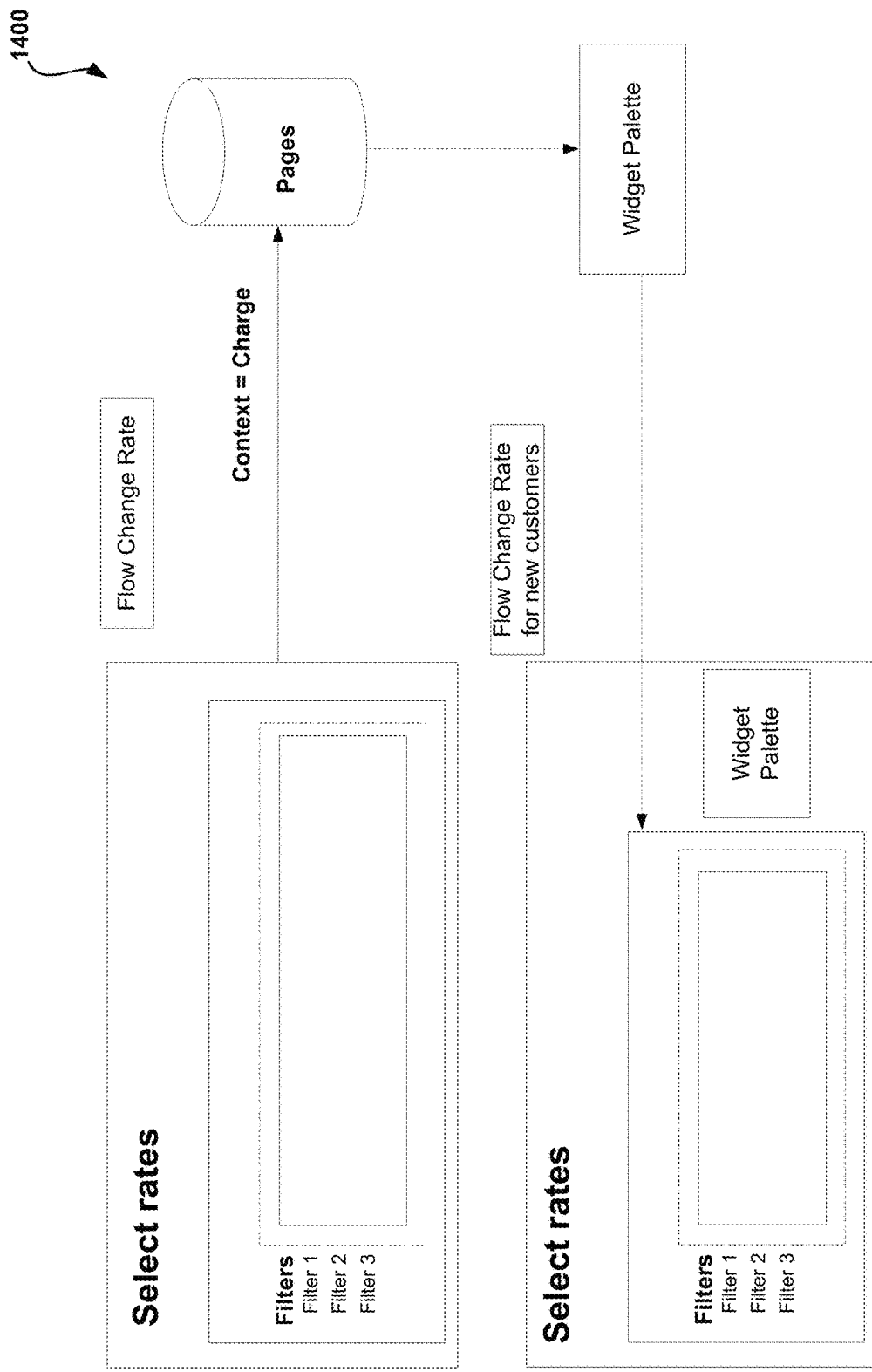
FIG. 14 illustrates a system flow for predesigned flow service reuse, in accordance with one embodiment.

FIG. 14 illustrates a system flow 1400 for predesigned flow service reuse, in accordance with one embodiment. As an option, the system flow 1400 may be implemented in the context of the details of the previous Figures. Of course, however, the system flow 1400 may be implemented in the context of any desired environment. Further, the aforementioned definitions may equally apply to the description below.

The marketing analyst has the ability to create the same flow service, without reusing the pre-designed service, by dragging and dropping from scratch all the widgets that composed this existing flow service. Finally, the user will get a new flow service with the same context, but it will be absolutely disconnected from the existing flow service. That is to say, any changes to this new flow service, will not affect the occurrences of the existing flow service.

In the business implementation studio system, the binding is done behind the scenes and the widgets in the palette are pre-bound to the fields.

The business implementation studio system offers a solution aiming to ease the selection of the most appropriate widgets for a given page context by not only providing the widgets that are graphically compatible in a given context, but also by providing only the widgets that are data type compatible with the context of the given page and given flow. The business implementation studio offers a modeling of the marketing customization interface as a graphical flow with widgets as customization points.

Figure 15:
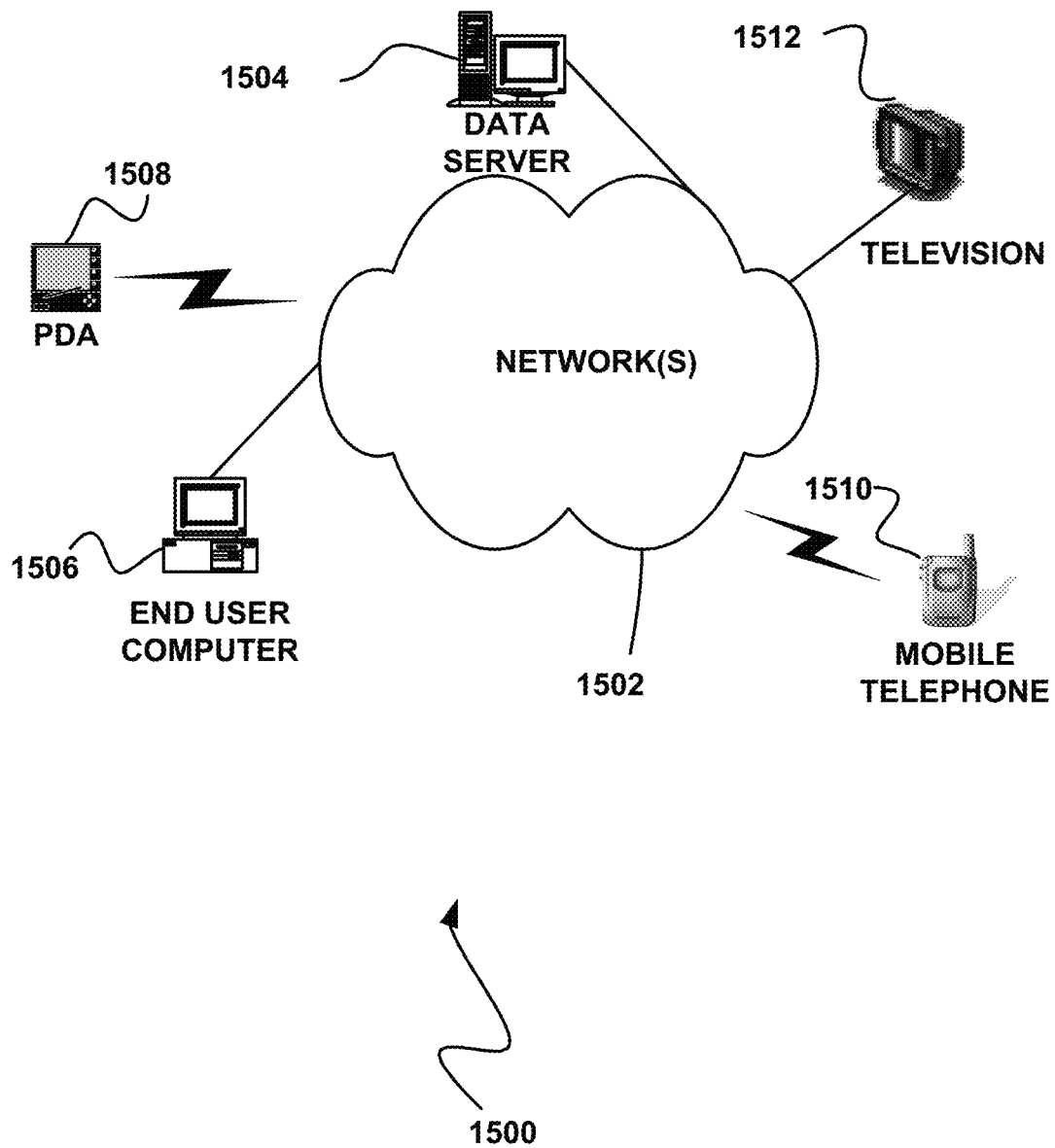
FIG. 15 illustrates a network architecture, in accordance with one possible embodiment.

FIG. 15 illustrates a network architecture 1500, in accordance with one possible embodiment. As shown, at least one network 1502 is provided. In the context of the present network architecture 1500, the network 1502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1502 may be provided.

Coupled to the network 1502 is a plurality of devices. For example, a server computer 1504 and an end user computer 1506 may be coupled to the network 1502 for communication purposes. Such end user computer 1506 may include a desktop computer, lap-top computer, and/or any other type of logic. Still yet, various other devices may be coupled to the network 1502 including a personal digital assistant (PDA) device 1508, a mobile phone device 1510, a television 1512, etc.

Figure 16:
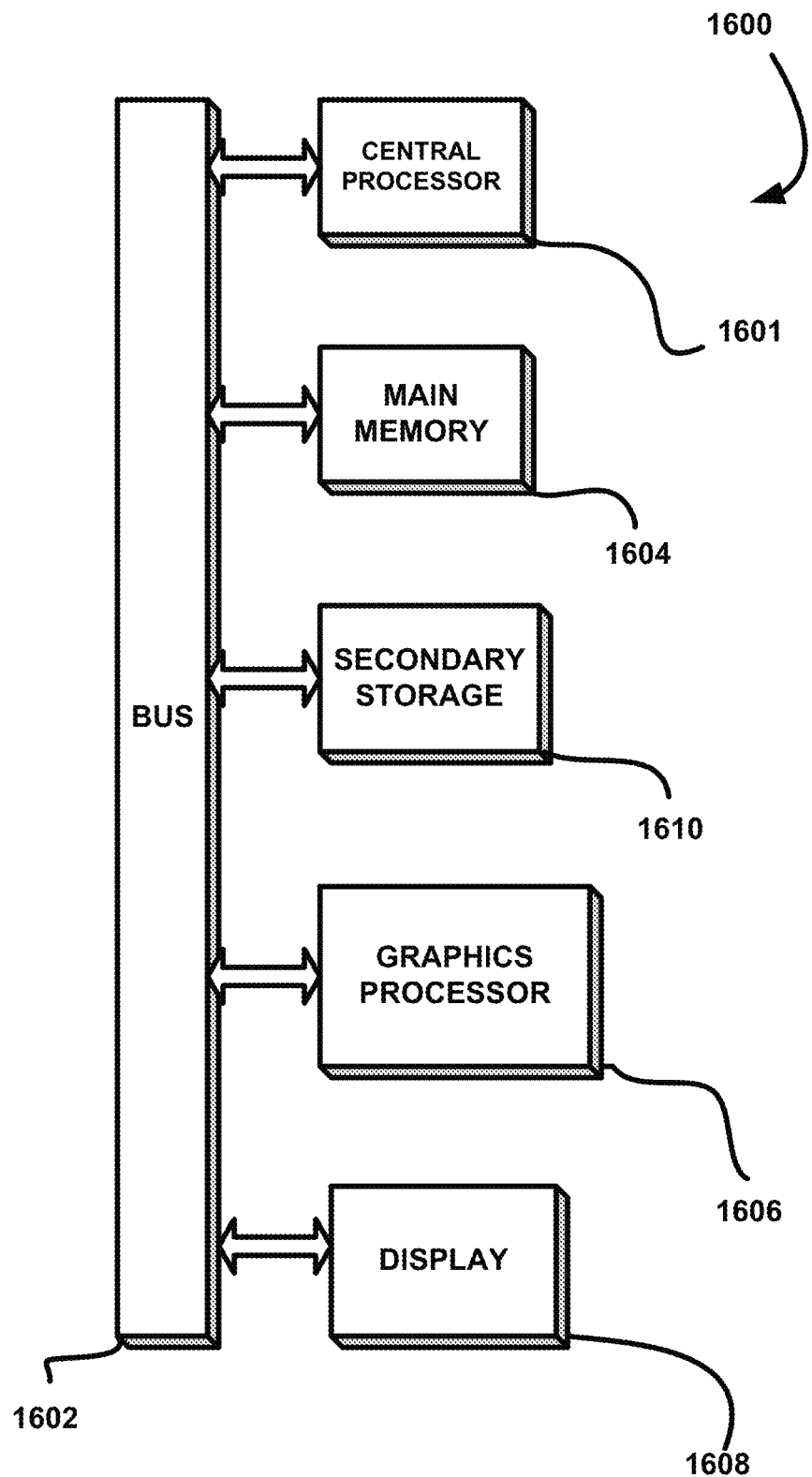
FIG. 16 illustrates an exemplary system, in accordance with one embodiment.

FIG. 16 illustrates an exemplary system 1600, in accordance with one embodiment. As an option, the system 1600 may be implemented in the context of any of the devices of the network architecture 1500 of FIG. 15. Of course, the system 1600 may be implemented in any desired environment.

As shown, a system 1600 is provided including at least one central processor 1601 which is connected to a communication bus 1602. The system 1600 also includes main memory 1604 [e.g. random access memory (RAM), etc.]. The system 1600 also includes a graphics processor 1606 and a display 1608.

The system 1600 may also include a secondary storage 1610. The secondary storage 1610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1604, the secondary storage 1610, and/or any other memory, for that matter. Such computer programs, when executed, enable the system 1600 to perform various functions (as set forth above, for example). Memory 1604, storage 1610 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
    storing, by a system, a plurality of business entities each having corresponding business entity fields, the plurality of business entities associated with products and services in a communication service provider industry and including promotion, discount, allowance, and product offer;
    providing, by the system, a first user interface of a first presentation layer presenting the plurality of business entities and corresponding business entity fields and allowing creation of business models based on the plurality of business entities;
    receiving, by the system from a business user through the first user interface of the system, a definition of a business model for a customer including:
        one or more business entities of the plurality of business entities selected by the business user in accordance with a business request, and
        the business entity fields corresponding to the one or more business entities;
    mapping, by the system, the business model to a technical model in a master enterprise catalog by:
        receiving, by the system from the business user through a second user interface of the system, a mapping of the business entity fields corresponding to the one or more business entities to technical entity fields corresponding to one or more technical entities of the technical model,
        wherein for each mapped business entity field and technical entity field, a name of the business entity field included in the business model is different from a name of the technical entity field in the technical model; and
    performing, by the system, an online translation between the business model and the technical model without synchronizing various databases by using a common persistent layer stored in a common database for both the business model and the technical model, the online translation including:
        responsive to a first set of updates made to the business model by the business user at a request of a customer via the first presentation layer, causing, by the system, a corresponding second set of updates to the technical model in the master enterprise catalog, based on the mapping of the business model to the technical model, wherein the first set of updates include at least a first update that is a submit operation performed for a first business entity and the second set of updates include at least a second update that corresponds to the first update and that is a create, update, or delete operation performed for at least one first technical entity, and
        responsive to a third set of updates made to the technical model in the master enterprise catalog via a second presentation layer different from the first presentation layer, causing, by the system, a corresponding fourth set of updates to the business model, based on the mapping of the business model to the technical model, wherein the third set of updates include at least a third update that is a load operation performed a second technical entity and the fourth set of updates include at least a fourth update that corresponds to the third update and that is a create operation performed for at least one second business entity;
    wherein the first user interface and the second user interface are made accessible to a plurality of business users associated with different customers, such that the system:
        receives, from each of the business users, a definition of a business model for an associated customer and a mapping of the business model to a corresponding technical model, and
        performs, for each of the business models, the online translation between the business model defined for the customer and the corresponding technical model without synchronizing the various databases.

2. The method of claim 1, wherein the mapping is received automatically based on a user selection, for each of the one or more business entities, of at least one of the business entity fields corresponding to the business entity and at least one of the technical entity fields corresponding to one of the technical entities.

3. The method of claim 1, wherein the mapping is received by the user writing mapping logic utilizing the second user interface.

4. The method of claim 1, wherein the business user uses a configuration tool having at least the second user interface to map the business model to the technical model.

5. The method of claim 1, wherein the business model is an abstraction of the technical model.

6. The method of claim 1, wherein the mapping of the business entity fields corresponding to the one or more business entities to the technical entity fields corresponding to one or more technical entities of the technical model includes:
    a mapping of a single business entity of the one or more business entities to two or more technical entities of the technical model, and
    a definition of a condition for the mapping of the single business entity to the two or more technical entities.

7. A computer program product embodied on a non-transitory computer readable medium, comprising computer code for:
  storing, by a system, a plurality of business entities each having corresponding business entity fields, the plurality of business entities associated with products and services in a communication service provider industry and including promotion, discount, allowance, and product offer;
  providing, by the system, a first user interface of a first presentation layer presenting the plurality of business entities and corresponding business entity fields and allowing creation of business models based on the plurality of business entities;
  receiving, by the system from a business user through the first user interface of the system, a definition of a business model for a customer including:
    one or more business entities of the plurality of business entities selected by the business user in accordance with a business request, and
    the business entity fields corresponding to the one or more business entities;
  mapping, by the system, the business model to a technical model in a master enterprise catalog by:
    receiving, by the system from the business user through a second user interface of the system, a mapping of the business entity fields corresponding to the one or more business entities to technical entity fields corresponding to one or more technical entities of the technical model,
    wherein for each mapped business entity field and technical entity field, a name of the business entity field included in the business model is different from a name of the technical entity field in the technical model; and
  performing, by the system, an online translation between the business model and the technical model without synchronizing various databases by using a common persistent layer stored in a common database for both the business model and the technical model, the online translation including:
    responsive to a first set of updates made to the business model by the business user at a request of a customer via the first presentation layer, causing, by the system, a corresponding second set of updates to the technical model in the master enterprise catalog, based on the mapping of the business model to the technical model, wherein the first set of updates include at least a first update that is a submit operation performed for a first business entity and the second set of updates include at least a second update that corresponds to the first update and that is a create, update, or delete operation performed for at least one first technical entity, and
    responsive to a third set of updates made to the technical model in the master enterprise catalog via a second presentation layer different from the first presentation layer, causing, by the system, a corresponding fourth set of updates to the business model, based on the mapping of the business model to the technical model, wherein the third set of updates include at least a third update that is a load operation performed a second technical entity and the fourth set of updates include at least a fourth update that corresponds to the third update and that is a create operation performed for at least one second business entity;
  wherein the first user interface and the second user interface are made accessible to a plurality of business users associated with different customers, such that the system:
    receives, from each of the business users, a definition of a business model for an associated customer and a mapping of the business model to a corresponding technical model, and
    performs, for each of the business models, the online translation between the business model defined for the customer and the corresponding technical model without synchronizing the various databases.

8. The computer program product of claim 7, wherein the mapping is received automatically based on a user selection, for each of the one or more business entities, of at least one of the business entity fields corresponding to the business entity and at least one of the technical entity fields corresponding to one of the technical entities.

9. The computer program product of claim 7, wherein the mapping is received by the user writing mapping logic utilizing the second user interface.

10. A system comprising:
  a memory system; and
  one or more processing cores coupled to the memory system and that are each configured for:
    storing, by the system, a plurality of business entities each having corresponding business entity fields, the plurality of business entities associated with products and services in a communication service provider industry and including promotion, discount, allowance, and product offer;
    providing, by the system, a first user interface of a first presentation layer presenting the plurality of business entities and corresponding business entity fields and allowing creation of business models based on the plurality of business entities;
    receiving, by the system from a business user through the first user interface of the system, a definition of a business model for a customer including:
      one or more business entities of the plurality of business entities selected by the business user in accordance with a business request, and
      the business entity fields corresponding to the one or more business entities;
    mapping, by the system, the business model to a technical model in a master enterprise catalog by:
      receiving, by the system from the business user through a second user interface of the system, a mapping of the business entity fields corresponding to the one or more business entities to technical entity fields corresponding to one or more technical entities of the technical model,
      wherein for each mapped business entity field and technical entity field, a name of the business entity field included in the business model is different from a name of the technical entity field in the technical model; and
    performing, by the system, an online translation between the business model and the technical model without synchronizing various databases by using a common persistent layer stored in a common database for both the business model and the technical model, the online translation including:

responsive to a first set of updates made to the business model by the business user at a request of a customer via the first presentation layer, causing, by the system, a corresponding second set of updates to the technical model in the master enterprise catalog, based on the mapping of the business model to the technical model, wherein the first set of updates include at least a first update that is a submit operation performed for a first business entity and the second set of updates include at least a second update that corresponds to the first update and that is a create, update, or delete operation performed for at least one first technical entity, and responsive to a third set of updates made to the technical model in the master enterprise catalog via a second presentation layer different from the first presentation layer, causing, by the system, a corresponding fourth set of updates to the business model, based on the mapping of the business model to the technical model, wherein the third set of updates include at least a third update that is a load operation performed a second technical entity and the fourth set of updates include at least a fourth update that corresponds to the third update and that is a create operation performed for at least one second business entity;

wherein the first user interface and the second user interface are made accessible to a plurality of business users associated with different customers, such that the system:

receives, from each of the business users, a definition of a business model for an associated customer and a mapping of the business model to a corresponding technical model, and performs, for each of the business models, the online translation between the business model defined for the customer and the corresponding technical model without synchronizing the various databases.

* * * * *